United States Patent Office 2,745,058
Patented May 8, 1956

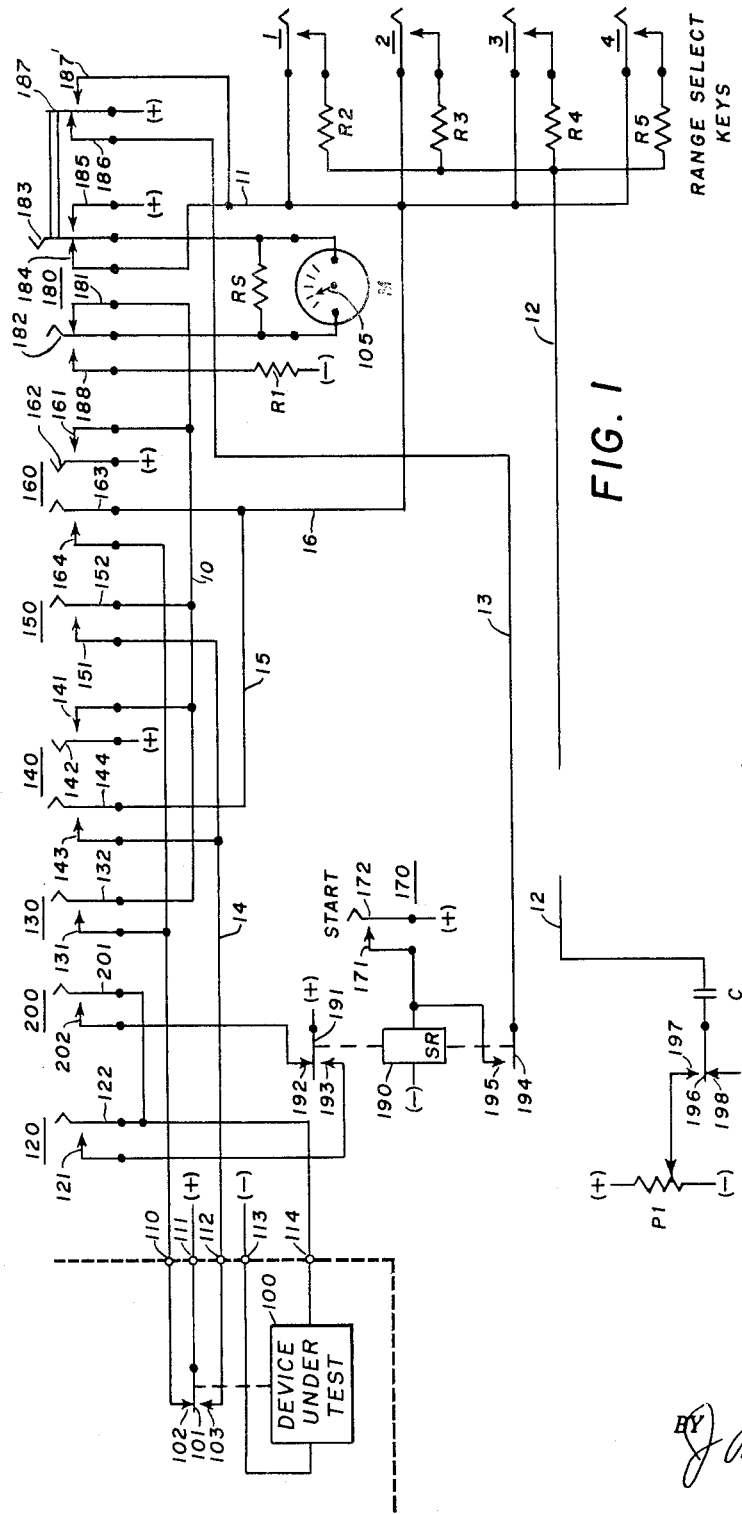

2,745,058

DIRECT READING TIME MEASURING DEVICE

Theodor Frankel, Rochester, N. Y., assignor, by mesne assignments, to General Dynamics Corporation, a corporation of Delaware Application August 14, 1952, Serial No. 304,315

11 Claims. (Cl. 324—28)

This invention relates to a testing device and more particularly to a direct reading time measuring device which is useful in determining the operate time of an electrical circuit.

In many electrical circuits, it is desirable to measure the time required for certain reactions. For example, it may become necessary to measure the time required for a set of contacts to open or to close; or a time measuring device may be useful with other apparatus, such as mechanically driven cam springs, dial springs, gas-filled tubes or the like.

In the past, three primary methods have been used for measuring time operation. One method comprises charging a capacitor over a period of time and then measuring the voltage stored on the capacitor by means of a suitable device such as a vacuum tube volt-ohm meter, or a ballistic galvanometer, for example, which is connected to the capacitor in parallel with or in place of the original charging path. This method has known drawbacks in that leakage of the capacitor through the meter tends to give false readings; furthermore, in the case of a vacuum tube meter, the reading circuit must have an input impedance high enough to avoid discharging the capacitor and yet have the stability required for accurate readings. This invention avoids the drawback of leakage through the reading circuit since this circuit is part of the original charging path. The reading is taken simultaneously with charging of the capacitor; hence the problem of subsequent leakage over another path is avoided. A second method of reading time intervals is through the use of a clock arrangement. When this device is used to read extremely short intervals of time, the errors introduced by the mechanical operation of the clock are often greater than the time interval being measured. A third arrangement provides a bridge circuit wherein a capacitor is charged over the time interval being measured and then this charge is compared with a capacitance having a known charge stored thereon. This arrangement is complicated and expensive. Readings are laborious, requiring a considerable amount of time.

An object of this invention is to provide a direct reading time measuring device, such as a meter, which quickly and accurately indicates the time interval being measured.

Another object of this invention is to provide a time measuring device of simple and economical design.

Still another object of this invention is to provide an arrangement indicating the time taken for an electrical circuit operation, the reading being taken simultaneously with the operation.

One embodiment of my invention accomplishes the above-stated objects and others which will be obvious to one skilled in the art by means of a meter which has no restoring spring. During the time interval being measured, a current is passed through the meter causing it to be deflected. At the end of the interval being measured, the deflecting current ceases whereupon the meter reading indicates the duration of the current. Since the meter contains no restoring spring, it remains in the position to which it last was deflected.

The invention will be understood more readily by referring to the accompanying drawings in which:

Fig. 1 shows a time measuring scheme which may be used in connection with any one of the other figures.

Fig. 2 shows an arrangement in which measurement is determined by the time required to charge a capacitor.

Fig. 3 shows a scheme wherein a direct time reading meter indicates the current passing through a nonlinear resistance.

Fig. 4 is another embodiment of my invention wherein a meter reads a time interval measured by a current flow.

My invention comprises a testing device shown in Fig. 1; while Figs. 2, 3 and 4 show several modifications which may be used in connection with Fig. 1. To use any modification, it is merely necessary to connect conductor 12 of Fig. 1 with conductor 12 of one of the Figs. 2, 3, or 4, as desired. Electrical potential is furnished by any suitable means, such as a battery, for example, the terminals of which are shown in the drawing as plus (+) and minus (—) signs. Conventionally, one pole of the battery is connected with ground, for example, when my invention is used in connection with telephone equipment, it may be desirable to ground the (+) terminal.

In Fig. 1, the device-under-test 100, such as a relay, for example, may be connected with the test circuit by any suitable means such as terminals 110, 111, 112, 113, and 114, for example. This device 100 is shown as controlling various contacts, i. e., between armature 101, and contacts 102 and 103; however, other circuit controlling devices could obviously be substituted therefor. Several members hereinafter called "keys" are shown which are capable of selecting the particular test which is to be made. That is, operation of keys 130 and 120 effect the measurement of the time required for armature 101 to break from contact 102 while operation of keys 140 and 120 control measurement of the time required for armature 101 to make with contact 103. Operation of keys 200 and 150 prepares the circuit to measure the time interval required for armature 101 to break from contact 103, and operation of keys 160 and 200 sets up an arrangement to measure the time required for armature 101 to return to its rest position where it makes with contact 102.

Assume first that the person conducting the test wishes to determine the time required for armature 101 to break from contact 102. Keys 120, 130 and one of the range select keys 1, 2, 3 or 4 are operated. The range select keys are adapted to choose between any of four different resistance values for the purpose of changing the scale reading on meter M to accommodate the particular time interval which is being measured. Key 120 prepares an operating circuit for device-under-test 100 while key 130 connects contact 102 with meter M. Assuming that Fig. 2 is connected with Fig. 1, the meter circuit is extended over conductor 12 to capacitor C. At this time, (+) is connected over contact 198 and armature 196 to discharge capacitor C.

The apparatus is now prepared for the first test which is initiated by operation of start key 170. This operation closes a circuit to relay 190 which extends from (+) over contacts 172 and 171 through the winding of relay 190 to (—) battery. Relay 190 operates and locks itself over a circuit which may be extended from (—) battery through the winding of relay 190 over contact 195 and operated armature 194, conductor 13, to (+) on contacts 186 and 187 of reset key 180. Relay 190 attracts its armature 191 to energize the device under test by way of (+) extended over operated armature 191, contact 193, closed contacts 121 and 122, terminal 114, through device-under-test 100, to terminal 113, and (—)

battery. The device-under-test 100 operates to attract armature 101 which breaks from contact 102. However, before these contacts open, a charging circuit is extended from (+) over terminal 111, armature 101, contact 102, terminal 110, through operated contacts 131 and 132 of key 130, conductor 10, contact 181 and spring 182 of reset key 180, the winding of meter M in parallel with resistance RS, key spring 183 and contact 184, conductor 11, and the operated one of the range select keys 1, 2, 3 or 4, conductor 12 to Fig. 2 where conductor 12 leads through capacitor C to armature 196 which is controlled by relay 190. Armature 196 was operated when relay 190 picked up from operation of start key 170; therefore, the charging circuit for capacitor C is extended through contact 197 to potentiometer P1. Capacitor C is now charged over the above-traced circuit during the time required for armature 101 to break from contact 102 at which time charging ceases. The coil of meter M is energized to deflect meter needle 105 according to the charging current applied to capacitor C during the break interval of armature 101 and contact 102. Meter M is not provided with a restoring spring; therefore, needle 105 remains in the position to which it last advanced. Thus, the reading on meter M is an indication of time. Resistance RS is a damping shunt which prevents needle 105 from overshooting to give a false reading.

After the break time interval of armature 101 and contact 102 has been read, keys 120 and 130 are returned to normal and reset key 180 is operated. Contacts 186 and 187 open to release relay 190 which had previously locked at its armature 194. Needle 105 of meter M is returned to its normal or rest position by a reverse current which is supplied from (+) through contact 185 and operated spring 183 to meter M in parallel with resistance RS, operated spring 182 and contact 188 to (—) battery by way of resistance R1. Relay 190 releases armature 191 thereby returning the device under test to normal and in turn armature 101 again makes with contact 102. Relay 190 also releases armature 196 thereby discharging capacitor C since (+) is applied to both sides of the capacitor, one side being supplied from contact 198 and the other side being supplied from contact 187. Next, reset key 180 is released.

Assume that the next test is to determine the length of time required for armature 101 to make with contact 103. In this case, key 120 is operated again to prepare a circuit for device-under-test 100. Key 140 is operated to switch the meter circuit to contact 103 and one of the range select keys 1, 2, 3 or 4 is operated depending upon the length of time which is to be measured. The circuit is now ready for the test which is initiated by the operation of start key 170. As before, a circuit is completed at operated springs 172 to energize relay 190 which in turn operates the device 100 and locks to (+) on spring 187 by way of operated armature 194. Armature 196 is operated by relay 190 to start the charging of capacitor C over a circuit which extends from (—) battery on potentiometer P1 to contact 197, and operated armature 196, through capacitor C to conductor 12, all of which are found in Fig. 2, and then over conductor 12 of Fig. 1 and one of the range select keys, to contact 184 and spring 183 through meter M in parallel with shunt resistance RS, spring 182, contact 181, to (+), by way of contact 141 and spring 142. Capacitor C is supplied with a charging current until armature 101 makes with contact 103 at which time (+) is extended over terminal 111, armature 101, contact 103, terminal 112, conductor 14, contact 143 and operated spring 144 of key 140, over conductors 15 and 16, conductor 11 through contact 184 and spring 183 to meter M. Needle 105 of meter M ceases to be deflected since the other side of the winding of meter M is also connected to (+) by way of reset key spring 182, contact 181, contact 141 and spring 142 of key 140. Once again needle 105 remains in the position to which it was advanced by the current charging capacitor C just prior to the completion of the shunting circuit at armature 101 and contact 103. After the meter is read, reset key 180 is again operated to release relay 190 and to return meter M to its normal position. Relay 190 releases armature 196 to discharge capacitor C, to break its own holding circuit and to release the device under test 100. Next, keys 120, 140 and 180 are returned to their normal positions.

Assume that the next test is to determine the time required for armature 101 to break from make spring 103. In this test, keys 200 and 150 are operated. The operation of key 200 caused the energization of device 100 over a circuit which may be traced from (—) battery at terminal 113, through the device 100, terminal 114, operated spring 201 and contact 202 to (+) by way of contact 192 and armature 191. The device under test operates, thereby attracting armature 101 which makes with contact spring 103. One of the range select keys 1, 2, 3 or 4 is operated depending upon the length of time which is to be measured. The circuit is now ready for the test.

The test for measuring the time interval required for armature 101 to break from contact 103 is initiated by the operation of start key 170 which extends to (+) on operated spring 172 to operate relay 190 and lock as before. Relay 190 also attracts armature 196 which makes with contact 197 for the purpose of controlling the charge built up on capacitor C. Armature 191 breaks from contact 192 thereby de-energizing the device 100 since the circuit extending from contact 193 is now open at released contacts 121 and 122. The device under test releases armature 101 which breaks from contact 103. During the interval between the time when relay 190 operates and armature 101 breaks from contact 103, a charging circuit is completed from capacitor C over a path which may be traced from (+) on terminal 111, to operated armature 101, contact 103, terminal 112, conductor 14, contact 151 and operated spring 152 of key 150, contact 181 and spring 182, through meter M and shunt resistance RS in parallel, spring 183 and contact 184 to conductor 11 over an operated range select key and conductor 12 to Fig. 2, through capacitor C to (—) battery by way of operated armature 196 and contact 197. Needle 105 of meter M is deflected in accordance with the charging current extended to capacitor C during the interval between the time when relay 190 attracted armature 196 and the time when armature 101 completely broke from contact 103. As before, needle 105 remains in the position to which it was last deflected since there is no restoring spring. After the break time interval has been read, reset key 180 is again actuated to release relay 190 and to return needle 105 to its normal position. Keys 200, 150 and reset key 180 are returned to their normal positions.

Assume that the next test is to measure the time interval required for armature 101 to make with contact 102. In this case, key 200, key 160 and one of the range select keys are operated. The device under test is energized over a circuit which may be traced from (—) battery to terminal 113, through the device 100, terminal 114, operated spring 201, contact 202, contact 192, to (+) by way of armature 191. The circuit is now ready for the test; therefore start key 170 is actuated to operate relay 190 which again locks at its armature 194 and which attracts armatures 191 and 196. Armature 191 releases the device 100 which in turn releases armature 101 to make with contact 102. Armature 196 once again completes a charging circuit for capacitor C. This time the meter reads the interval between the time when armature 196 was attracted and the time when armature 101 makes the contact 102. More specifically, when armature 196 is attracted, a charging circuit is completed from potentiometer P1 over contact 197 and operated armature 196, through capacitor C to conductor 12 and Fig. 1, through an operated one of the range select keys to conductor 11, contact 184, spring 183, in parallel through meter M and shunt resistance RS, to spring 182, contact 181, contact 161 and to (+) by way of spring 162. A charge is now built on capacitor C to measure the time interval required for armature 101 to make with contact 102, at which time (+) is extended by way of terminal 111 to released armature 101, contact 102, terminal 110, contact 164, spring 163, conductor 16, conductor 11, contact 184 and spring 183, to meter M and resistance RS. Needle 105 is no longer deflected since the other side of the winding of meter M is also connected to (+) by way of spring 182, contact 181, contact 161, and spring 162. Since there is no restoring spring, the meter remains in the position to which it was deflected just prior to the completion of the shunt circuit by armature 101 and contact 102. After the meter is read, reset key 180 is again operated to release relay 190 and to return needle 105 to its normal position.

Since the tests have been completed, all keys are returned to normal after which time any or all tests may be repeated or another device may be substituted for device 100, which was just tested.

Other embodiments of my invention provide a device which may be substituted for capacitor C of Fig. 2. For example, Fig. 3 may be connected with Fig. 1 by joining conductor 12 of Fig. 3 with conductor 12 of Fig. 1. In this embodiment of the invention, a nonlinear resistance 300 is substituted for capacitor C. This nonlinear resistance 300 may be of any suitable type such as that commonly called a "thermistor," for example. The "thermistor" is a device having a negative temperature coefficient, which is to say that when first energized a small current flows through element 300. This element begins to heat and the current increases as a function of time. In this embodiment of the invention, the tests are carried on exactly as in the case described above in connection with capacitor C; however, this time meter M reads the highest current passed by nonlinear resistance 300 during the time interval under measurement. It should be understood that armature 396 is controlled by relay 190 in exactly the same manner as was armature 196.

Still another embodiment of my invention is shown in Fig. 4 which also may be connected with Fig. 1 by means of conductor 12. In this device a simple resistance element 400 is substituted for capacitor C. Once again armature 496 is controlled by relay 190 in exactly the same manner as was armature 196. In this embodiment, meter M is arranged to rotate constantly and at a uniform rate of speed so long as current passes through its winding. The various components selected are such as to cause needle 105 of meter M to read a full scale deflection in the maximum time interval which is to be measured. This embodiment functions somewhat similarly to the description of Fig. 2 which was given above; however, meter M itself furnishes the time integration without depending upon the characteristics of any other device such as capacitor C and nonlinear resistance 300. That is to say, current through the coil of meter M begins to deflect needle 105 which in turn drifts constantly and uniformly as a function of time. The drift stops when the device under test either makes or breaks its contacts, as the case may be. When this happens the coil of meter M no longer receives an operating current and needle 105 ceases to drift; therefore, the position to which it has drifted indicates the time required for the making or breaking of a circuit by device 100.

Other modifications of my invention will be obvious to those skilled in the art; for example, the ionization time of a gas tube could be read, or almost any circuit controlling device could be substituted for device 100. My invention could also be used to measure other devices which have a property which depends upon time as a function. For example, my invention could be adapted to measure speed of a moving body, or the chemical change of an electrolyte. Therefore, it is my intention to claim the invention shown as well as such modifications as may be obvious to one skilled in the art.

What I claim is:

1. A direct reading time measuring device for determining the length of a brief time interval comprising; non-self-restoring means for measuring the present value of an electrical quantity under observation, means for turning said electrical quantity off and on within said brief interval of time, means for responding to said electrical quantity of a non-linear basis with respect to said brief time interval, and means including said non-linear means for connecting said measuring means to said off and on means whereby said brief time interval may be measured.

2. A direct reading time measuring device comprising non-self-restoring means for detecting electrical currents, indicating means responsive to said last named means for recording the duration of said electrical currents, means for producing a change in said electrical current within an extremely short period of time, means for responding to said electrical quantity on a non-linear basis with respect to said short time period, means for interconnecting said non-self-restoring means, said change producing means and said non-linear means whereby said indicating means records the duration of said electrical current, and means for resetting said non-self-restoring means to a zero position.

3. A device for indicating the time required for a current change in an electrical circuit comprising; non-self-restoring means for measuring and indicating an electrical quantity relating to current change with respect to time, a device-under-test having an output which is subject to change within an extremely brief period of time, means including a capacitor for connecting said non-self-restoring means to be controlled by said output to measure said current change when flow is in one direction, and means for operating said non-self-restoring means responsive to current flow in a direction that is opposite to said one direction for returning said non-self-restoring means to a zero position.

4. An instrument comprising non-self-restoring means for measuring a quantity of current flowing in a given direction during a brief interval of time, the response time required for said measuring means to reach its maximum measurement being greater than said brief interval, means for controlling said current within said brief interval, means for connecting said control means to operate said measuring means, whereby said measuring means indicates total current flow during said brief interval, and means for operating said non-self-restoring means responsive to current flow in a direction that is opposite to said one direction for returning said non-self-restoring means to a zero position.

5. The instrument of claim 4 in which said means for connecting includes means which have non-linear characteristics which vary as a function of time with respect to said quantity.

6. The instrument of claim 5 in which said means for controlling said current comprises a first relay having at least a first set of contacts, a second relay having at least a second set of contacts, said means for connecting including said sets of contacts and said measuring means connected in series, means for operating said second relay to complete said circuit at said second set of contacts, and means responsive to the operation of said second relay for initiating operation of said first relay thereby opening said connection at said first set of contacts after said brief interval whereby the operate time of said first relay is measured.

7. An instrument for measuring a brief interval of time comprising; non-self-restoring means for measuring the value of an electrical quantity of current, the response time required for said measuring means to reach its maximum measurement being greater than said brief interval, means for controlling said current within said brief interval comprising a relay having at least make and break contacts; means effective at a time when said relay is released for completing a first circuit including said break contacts and said measuring means, means effective simultaneously with said last named means for operating said relay thereby opening said break contacts to open said first circuit, whereby the time required for said break contacts to open is measured; means effective at a time when said relay is operated for completing a second circuit to energize said measuring means, means effective simultaneously with said last named means for releasing said relay thereby closing said break contacts, means responsive to closure of said break contacts for shunting said measuring means, whereby the time required for said break contacts to close is measured; means effective at a time when said relay is released for completing a third circuit to energize said measuring means, means effective simultaneously with said last means for operating said relay thereby closing said make contacts, means responsive to closure of said make contacts for shunting said measuring means, whereby the time required for said make contacts to close is measured; means effective at a time when said relay is operated for completing a fourth circuit including said make contacts and said measuring means, and means effective simultaneously with said last named means for releasing said relay thereby opening said make contacts for breaking said fourth circuit, whereby the time required for said make contacts to open is measured.

8. An instrument for measuring a brief interval of time comprising; non-self-restoring means for measuring the value of an electrical quantity of current, the response time required for said measuring means to reach its maximum measurement being greater than said brief interval, means for controlling said current within said brief interval of time comprising a relay having at least make and break contacts, means effective at a time when said relay is released for completing an operating circuit including said break contacts and said measuring means, and means effective simultaneously with said last named means for operating said relay thereby opening said break contacts to open said operating circuit, whereby the time required for said break contacts to open is measured.

9. An instrument for measuring a brief interval of time comprising; non-self-restoring means for measuring the value of an electrical quantity of current, the response time required for said measuring means to reach its maximum measurement being greater than said brief interval, means for controlling said current within said brief interval of time comprising a relay having at least make and break contacts, means effective at a time when said relay is operated for energizing said measuring means, means effective simultaneously with said last named means for releasing said relay thereby closing said break contacts, and means responsive to closure of said break contacts for shunting said measuring means, whereby the time required for said break contacts to close is measured.

10. An instrument for measuring a brief interval of time comprising; non-self-restoring means for measuring the value of an electrical quantity of current, the response time required for said measuring means to reach its maximum measurement being greater than said brief interval, means for controlling said current within said brief interval of time comprising a relay having at least make and break contacts, means effective at a time when said relay is released for energizing said measuring means, means effective simultaneously with said last named means for operating said relay thereby closing said make contacts, and means responsive to closure of said make contacts for shunting said measuirng means, whereby the time required for said make contacts to close is measured.

11. An instrument for measuring a brief interval of time comprising; non-self-restoring means for measuring the value of an electrical quantity of current, the response time required for said measuring means to reach its maximum measurement being greater than said brief interval, means for controlling said current within said brief interval of time comprising a relay having at least make and break contacts, means effective at a time when said relay is operated for completing a circuit including said make contacts and said measuring means, and means effective simultaneously with said last named means for releasing said relay thereby opening said make contacts to open said circuit, whereby the time required for said make contacts to open is measured.

References Cited in the file of this patent

UNITED STATES PATENTS

| | | |
|---|---|---|
| 1,677,157 | Weaver | July 17, 1928 |
| 2,012,837 | Tear | Aug. 27, 1935 |
| 2,072,812 | Galt | Mar. 2, 1937 |
| 2,301,196 | Bradford | Nov. 10, 1942 |
| 2,496,622 | Dubuar | Feb. 7, 1950 |
| 2,502,450 | Gittings | Apr. 4, 1950 |
| 2,545,541 | Blair | Mar. 20, 1951 |